US008691723B2

(12) United States Patent
Hibst et al.

(10) Patent No.: US 8,691,723 B2
(45) Date of Patent: Apr. 8, 2014

(54) METHOD FOR THE SEQUENTIAL PRODUCTION OF A HETEROGENEOUS CATALYST LIBRARY

(75) Inventors: Hartmut Hibst, Schriesheim (DE); Frieder Borgmeier, Mannheim (DE); Martin Dieterle, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1629 days.

(21) Appl. No.: 10/567,029

(22) PCT Filed: Jul. 30, 2004

(86) PCT No.: PCT/EP2004/008606
§ 371 (c)(1),
(2), (4) Date: Feb. 3, 2006

(87) PCT Pub. No.: WO2005/016513
PCT Pub. Date: Feb. 24, 2005

(65) Prior Publication Data
US 2006/0177370 A1 Aug. 10, 2006

(30) Foreign Application Priority Data
Aug. 6, 2003 (DE) .................................. 103 35 968

(51) Int. Cl.
*C01B 31/08* (2006.01)
(52) U.S. Cl.
USPC ........... 502/423; 502/305; 502/306; 502/307; 502/308; 502/310; 502/311; 502/312; 502/315; 502/317; 502/318; 502/309; 502/321; 502/340; 502/344; 502/353; 526/310; 526/312; 526/311
(58) Field of Classification Search
None
See application file for complete search history.

(56) References Cited

U.S. PATENT DOCUMENTS

| | | | |
|---|---|---|---|
| 3,935,971 A | 2/1976 | Papoff et al. | |
| 4,520,127 A * | 5/1985 | Otake et al. | 502/209 |
| 5,521,133 A | 5/1996 | Koermer et al. | |
| 6,200,923 B1 * | 3/2001 | Garoff et al. | 502/127 |
| 6,373,570 B1 * | 4/2002 | McFarland et al. | 356/364 |
| 6,689,613 B1 * | 2/2004 | Sun et al. | 436/37 |
| 6,806,087 B2 * | 10/2004 | Kibby et al. | 436/37 |
| 2001/0039330 A1 * | 11/2001 | Schunk et al. | 530/350 |
| 2002/0142093 A1 | 10/2002 | Gibson et al. | |
| 2003/0035756 A1 * | 2/2003 | Nelson et al. | 422/68.1 |
| 2003/0077206 A1 * | 4/2003 | Metz et al. | 422/102 |
| 2004/0110636 A1 * | 6/2004 | Lugmair et al. | 502/439 |
| 2004/0147393 A1 * | 7/2004 | Hibst et al. | 502/302 |

FOREIGN PATENT DOCUMENTS

| | | | |
|---|---|---|---|
| DE | 2 250 274 | 4/1974 | |
| DE | 199 55 789 | 5/2001 | |
| EP | 0603836 A1 * | 12/1993 | ............ B01J 27/057 |
| EP | 0 603 836 | 6/1994 | |
| EP | 1 101 832 | 5/2001 | |
| EP | 1 283 073 | 2/2003 | |
| WO | 96/11878 | 4/1996 | |
| WO | 98/47613 | 10/1998 | |
| WO | 02/04112 | 1/2002 | |

OTHER PUBLICATIONS

Claus, Peter et al., "Miniaturization of screening devices for the combinatorial development of heterogeneous catalysts", Catalysis Today, vol. 67, No. 4, pp. 319-339, 2001.
Xiang, X.-D et al. "A Combinatorial Approach to Materials Discovery", Science, vol. 268, pp. 1738-1740, 1995.

* cited by examiner

Primary Examiner — Melvin C Mayes
Assistant Examiner — Smita Patel
(74) Attorney, Agent, or Firm — Oblon, Spivak, McClelland, Maier & Neustadt, L.L.P.

(57) ABSTRACT

The sequential production of a library of N different solids, in particular heterogeneous catalysts, where N within a day is an integer of at least 2, is performed by
  a) producing at least two different sprayable solutions, emulsions and/or dispersions of elements and/or element compounds of the chemical elements present in the catalyst and optionally of dispersions of inorganic support materials,
  b) continuously metering the at least two different solutions, emulsions and/or dispersions in a predefined ratio into a mixing apparatus in which the solutions, emulsions and/or dispersions are homogeneously mixed,
  c) continuously drying the mixture removed from the mixing apparatus and recovering the dried mixture,
  d) changing the ratios in step b) and repeating steps b), c) and d) (N−1) times until N different dried mixtures are obtained,
  e) optionally shaping and optionally calcining the mixtures to give the solids.

20 Claims, No Drawings

METHOD FOR THE SEQUENTIAL PRODUCTION OF A HETEROGENEOUS CATALYST LIBRARY

The invention relates to a process for producing a heterogeneous catalyst library and to an apparatus suitable therefor.

To prepare and study novel chemical compounds, in addition to classic chemistry which is directed toward the synthesis and study of individual substances, which combinatorial chemistry has developed. In this approach, a multiplicity of reactants were reacted in a one-pot synthesis and analyzed as to whether the resultant reaction mixture displayed the desired properties, for example a pharmacological activity. If an activity was found for such a reaction mixture, it was necessary to determine in a further step which specific substance in the reaction mixture was responsible for the activity. In addition to the high expenditure for determining the actual active compound, it was difficult with a multiplicity of reactants to exclude unwanted side reactions.

In another high-throughput synthesis approach, a multiplicity of compounds are synthesized by specific dosage and reaction of a number of reactants in a multiplicity of different reaction vessels. In this process, preferably, in each reaction vessel one reaction product is present, so that in the event of, for example, a given pharmacological activity of a mixture, the starting materials used for its preparation are known immediately.

In addition to the first applications of this more specific combinatorial synthesis in the search for novel pharmacologically active substances, very recently the synthesis method has also been extended to low-molecular-weight organic compounds and to organic and inorganic catalysts.

X.-D. Xiang et al., "A Combinatorial Approach for Materials Discovery", Science 268, (1995), pages 1738 to 1740 describe the preparation of BiSrCaCuO and YBaCuO superconductivity films on substrates, a combinatorial array of different metal compositions being obtained by physical masking processes and vapor deposition techniques in the deposition of the appropriate metals. After the calcination, different compositions are present at different positions of the array and can be studied by microprobes, for their conductivity for example.

WO 96/11878 describes, in addition to the preparation of such superconductivity arrays, the preparation of zeolites, the amounts required in each case being metered without prior mixing from a plurality of metal salt solutions using an ink jet onto a type of spot plate, a precipitation starting on addition of the last solution. BSCCO superconductors can also be prepared by separate metering of the individual nitrate solutions of the metals required by spraying onto a type of spot plate and subsequent heating.

WO 98/47613 discloses a number of processes by which libraries of potentially interesting materials can be produced using sputtering, CVD or PVD techniques. In the core, this application relates to the use of suitable masking techniques which makes possible defined separation of at least two components (which are present as separate substrates) on one substrate, as a result of which composite materials are obtained. Furthermore, by means of the process, complete libraries of materials of differing composition can be produced by producing gradients on the sputtered substrate.

The processes described have a number of disadvantages. Firstly, continuous compact libraries are produced on one substrate which can only be tested separately from one another for desired properties subsequently by mechanical separation. Secondly, the sample amounts produced by these substrate coating techniques are very small (only a few milligrams as thin layers on substrates), so that a defined treatment, such as by sintering processes or treatment with defined media (liquids, gases), poses difficulties, in particular in the case of reproducing process parameters or scaling up sample quantities. A further disadvantage of the sputtering process is that the morphology of the materials produced can differ greatly with respect to crystallinity and particle size from materials produced by conventional techniques, that is to say by spraying, precipitation or impregnation techniques. Thus applicability of the parameters determined by this combinatorial method is uncertain, because material properties, for example hardness, ionic conductivity, heat conductivity, dielectric constants, electrical conductivity, thermoelectromotive force, magnetic properties, porosity, depend to a great extent on, inter alia, the crystallinity, the crystallographic nature of the crystallites or the degree of fineness of the particles, the defects and grain boundaries and other parameters which can be greatly affected by the production parameters. A further problem of the production techniques described is testing a useful property of the material without the effect of the substrate, which is only possible with difficulty owing to the small amount of material and film thickness. For special applications, such as electronic or magnetic properties, it is of great interest to produce unsupported materials and test the resultant materials for their useful properties.

DE-A-199 55 789 discloses a process for the combinatorial production of a library of materials in the form of a two-dimensional matrix in the surface region of a flat substrate in which at least two different sprayable material components, for example solutions or dispersions, are sprayed onto the same side of the substrate from at least two spray nozzles which are at a distance from the substrate and from one another, so that materials of a different composition are obtained in different surface regions of the substrate.

This process also does not permit the production of relatively large amounts of material.

DE A-103 03 526, which has an earlier priority (priority of Jan. 29, 2003) but which had not been published at the time of filing the present application, relates to a process for producing a multi-metal oxide composition, in which, from the starting compounds required for producing the multi-metal oxide composition, a mixture solution is produced continuously in a solvent, the mixture solution is continuously fed into a drying apparatus to remove the solvent and the resultant solid is thermally treated at elevated temperature. In this process the precursor solutions are made up of at least two spatially separated subsolutions, each containing subquantities of the required starting compounds.

WO 02/04112 relates to processes for analyzing heterogeneous catalysts in a multi-variable screening reactor. The reactor is preferably a parallel flow reactor. FIG. 2A shows a parallel flow reactor in which different reaction conditions can be set in different flow reactors. Different evaluation methods can be carried out.

EP-A-1 283 073 describes the parallel production of supported catalysts in impregnation vessels in which supports are impregnated in parallel and are then dried and calcined.

It is an object of the present invention to provide a process for producing a library of solids, in particular heterogeneous catalysts, which avoids the disadvantages of the known processes and also permits the preparation of relatively large amounts of heterogeneous catalysts in a rapid and efficient manner.

We have found that this object is achieved according to the invention by a process for the sequential production of a library of N different solids, in particular heterogeneous catalysts, where N is an integer of at least 2, by a) producing at least two different sprayable solutions, emulsions and/or dispersions of elements and/or element compounds of the chemical elements present in the catalyst and optionally of dispersions of inorganic support materials,
b) continuously metering the at least two different solutions, emulsions and/or dispersions in a predefined ratio into a mixing apparatus in which the solutions, emulsions and/or dispersions are homogeneously mixed,
c) continuously drying the mixture removed from the mixing apparatus and recovering the dried mixture,
d) changing the ratios in step b) and repeating steps b), c) and d) (N−1) times until N different dried mixtures are obtained,
e) optionally calcining the mixtures to give the solids, in particular heterogeneous catalysts.

The term “library of heterogeneous catalysts” can mean here that a multiplicity of different heterogeneous catalysts is produced on one substrate, the substrate having subdivisions for the separate uptake of the separate heterogeneous catalysts. Preferably, in this case, the abovementioned numbers of different heterogeneous catalysts are present on the substrate.

Alternatively, the different solids, in particular heterogeneous catalysts, can be introduced into a multiple reactor in which they then form an array or a library of heterogeneous catalysts. The multiple reactors can be, for example, tubular reactors, which contain a multiplicity of tubes, in particular 2, 4, 8, 16 or 64, etc. tubes. Suitable multiple reactors are described, for example, in WO 02/04112, DE-A-199 55 789, DE-A-199 59 973 and the literature cited therein.

We have found that this object is achieved according to the invention, in addition, by a process for the parallel testing of the libraries of solids obtained by the abovementioned process, which solids are in particular heterogeneous catalysts, for a desired catalytic property, comprising separately introducing the individual solids into multiple reactors and subsequently carrying out the steps required for testing for a desired catalytic property. The processes for the parallel testing are likewise described in more detail in the publications above.

A multiplicity of organic or inorganic solids can be produced according to the invention. In particular, inorganic solids, especially heterogeneous catalysts, are produced. N different solids are produced within one day (24 hours). The inventive process permits the rapid sequential production of N different solids, in particular heterogeneous catalysts, within a short time. By conventional processes, to date, only one solid or heterogeneous catalyst could be produced within one day. The inventive process also permits the automation and the considerable acceleration of the production of solids, in particular heterogeneous catalysts.

In step b) homogeneous mixing is carried out. Homogeneous mixing is demonstrated after drying the mixture by analyzing the compositions of the dried particles or grains. According to the invention, between individual dried grains there is a difference in composition of at most 30%, preferably at most 15%, in particular at most 5%. Differences in composition here can be measured by a spatially resolved microstructural elemental analysis, for example by ESCA, EDX, XPS and similar methods.

The shaping in step e) includes, for example, tabletting or producing fragments. For example, the dried mixtures can first be tableted, whereupon the tablets are crushed to form fragments, which is followed by calcination.

N is an integer of at least 2, preferably at least 9, particularly preferably at least 45, in particular at least 90. This means that in the process at least 2, preferably at least 9, particularly preferably at least 45, in particular at least 90, different heterogeneous catalysts are produced one after the other. The upper limit can be, for example, 50 000, preferably, for example, 5 000. This is changed by changing the ratio of the different solutions, emulsions and/or dispersions of elements and/or element compounds of the chemical elements present in the catalyst. The solutions, emulsions and/or dispersions are customarily continuously metered by pumps. Customarily, for each solution, emulsion and/or dispersion there is provided a storage vessel which contains the respective solution, emulsion and/or dispersion. Each of the storage vessels preferably has a volume of from 50 to 50 000 ml, more preferably from 100 to 10 000 ml, particularly preferably from 500 to 5 000 ml. Each of the storage vessels is connected to the mixing apparatus by means of a pump via a pipe or a tube, so that from each storage vessel one liquid stream can individually be pumped into the mixing apparatus. In the mixing apparatus the different substreams of the individual storage vessels are thereby combined to form a total stream. The different substreams flow together to form the total stream each at a predetermined flow velocity. The metering of the different streams into the mixing apparatus can be performed directly within the mixing apparatus or upstream of the mixing apparatus. The mixing apparatus can be any suitable mixing apparatus which is suitable for mixing as homogeneously as possible solutions, emulsions and/or dispersions. For example, it can be a static or dynamic mixer. Preferably, a dynamic mixer is used. The mixing action should be of a size such that a system as homogeneous as possible, as described, is produced, for example in the form of a solution, emulsion and/or dispersion.

In the simplest case, the at least two solution substreams are then passed to the two inlets of a T piece (preferably the feeds narrow in the inlet part of the T piece). In the interior of the T piece the two solution substreams combine and flow together as a total solution stream into the outlet part of the T piece via which the total solution stream is removed from the T piece. After the two solution substreams combine, on their further passage as total solution stream, their essentially homogeneous mixing takes place, which can be caused, for example, predominantly by turbulence generated during their combination.

In the outlet path, however, a static mixer (for example one of the SMXS type from Sulzer Chemtech, D-61239 Ober-Mörlen-Ziegenberg) and/or a dynamic mixer can additionally be integrated, through which the total solution stream flows and leaves as an essentially homogeneous mixed solution stream. In principle, static or dynamic mixers are spaces which contain fixed obstacles or moving obstacles, respectively, which act on the flow of the mixed solution stream so that in the same turbulence is produced which causes the mixing to form a mixed solution stream. “Static mixer” means a mixer which contains fixed mixing devices, for example flow pins, which the materials to be mixed flow past and are mixed together by vortexing and other disturbances; “dynamic mixers” are those which contain active mixing devices, for example in the form of rotating mixing veins; in these the materials to be mixed are mixed together by active transport.

It has been proven in practice to give additional reinforcement to the mixing in the mixing zone, or to cause it exclusively, by the action of ultrasound (for example ultrasonic transducer UIP 50 from Dr. Hielscher). For this, for example, a rod-shaped ultrasonic probe can be introduced into the mixing zone.

Of course, the number of inlets of the “T piece” in the abovementioned exemplary embodiment of the inventive process can also be more than two, without significant change in the basic principle of the procedure.

The mixture is transferred from the mixing apparatus into a dryer, which permits rapid drying of the solutions, emulsions and/or dispersions. The mixture can be passed from the mixing apparatus to the dryer through a further pipe having an intermediate pump. It is also possible to utilize the preexisting pressure, or the preexisting flow, for the transport into the dryer.

The mixture is also sometimes drawn through the dryer by suction, in the event of suitable geometry.

The individual substreams can, as described, first be mixed in a mixing apparatus and then transferred to the dryer. It is also possible to combine the individual components directly in a spray nozzle of the dryer, so that mixing and start of drying coincide.

The dryers used can be all suitable dryers using which rapid drying of solutions, emulsions and/or dispersions is possible. Preferably, spray dryers or spray freeze dryers are used. The spray dryers or spray freeze dryers can be designed in a conventional manner.

The mixed solution stream produced as described can be passed directly and along the shortest route to the atomizer head of a spray dryer (for example a Minor Hi-Tec Niro Atomizer from Niro, Copenhagen, DK) and disintegrated into finely divided droplets which are dried by contact with hot gas (for example air or nitrogen or mixtures of air and nitrogen, or noble gases, or carbon oxides). The inlet temperature of the hot gas, in the case of the abovementioned spray dryer, can be in the inventive process, for example, from 200 to 400° C., preferably from 310 to 330° C. The outlet temperature of the dry gas should be according to the invention from 100 to 200° C., preferably from 105 to 115° C. In the spray dryer, the atomized mixed solution and the hot dry gas can be conducted co-currently or counter-currently. The droplet sizes resulting on atomization is customarily from 5 to 1 000 µm, frequently from 10 to 100 µm. The drying time of such droplets is, in conventional spray dryers, less than one second. In principle, the spray drying in the inventive process can also be carried out as described in EP-A-0 603 836.

The total solution can be atomized in the inventive process by means of nozzles (for example by means of swell-plate nozzles and two-fluid nozzles), by means of gas-pressure atomizers or by means of spraying disks or spraying baskets (sometimes also termed "rotary nozzles"). Two-fluid nozzles, spraying disks and spraying baskets are preferred according to the invention. Although the latter, compared with other nozzles, require greater technical expenditure with higher energy consumption, they are less sensitive to solid particles which may form. The total solution in general then flows unpressurized to the disk or basket center, is distributed and is sprayed off as a hollow cone from the smooth disk rim or from the perforated basket rim.

The solution substreams in the inventive process, however, can also be fed directly to a dynamic mixer, as described by DE-A-100 43 489, micromixers according to DE-A-100 41 823 or mixer nozzles according to DE-A-199 58 355 and mixed according to the invention in these. Mixing nozzles of this type which can be used for the inventive process are smooth-jet nozzles, levo nozzles, Bosch nozzles or jet dispersers. Preference is given according to the invention to the use of mixer nozzles which cause not only the combination of the solution substreams and their mixing, but also the division of the resultant mixed stream. The atomized total solutions can then be dried, as in a spray dryer, by means of hot gases co-currently or counter-currently. The advantage of the inventive procedure is based on the production of stable subsolutions which are not combined and mixed continuously until they are flowing, as a result of which a mixed solution stream is produced directly and with minimal time demand, which mixed solution streams can be spray dried with a narrow residence time distribution without loss of time.

The ratio in the above steps b) and d) can be set and changed by changing or adapting the flow velocity in the different solutions, emulsions and/or dispersions during metering into the mixing apparatus. Differing types or concentrations of starting materials can be present in the different storage vessels. To avoid excessive amounts of liquid, depending on the desired product composition, different concentrations of the solutions, emulsions and/or dispersions can also thus be taken off from the storage vessels. The total amount, that is to say the total stream, can be varied, for example within the range of the optimum mode of action of the drying apparatus, in particular the spray dryer. The total stream is thus controlled in such a manner that optimum drying is ensured in the subsequent step. The optimum working ranges of, for example, spray dryers are known to those skilled in the art. The mixed solutions, emulsions and/or dispersions can also be diluted by water to achieve a desired amount of liquid and a desired product content. Preferably, the total stream which is produced from combining the different substreams from the different storage vessels is kept essentially or exactly constant. This means that a constant material stream (total stream) flows through the mixing apparatus and the dryer. This has the advantage that the control of the mixing action and the drying action does not have to be renewed for each different catalyst composition, but is set once and then remains constant in the process. Deviations of a maximum of ±50%, preferably a maximum of ±20%, in particular a maximum of ±5%, can frequently be tolerated. In the inventive process, the substreams from the different storage vessels are first set to obtain a desired mixing ratio of the components. Then, spray drying is continued with these substreams until a desired amount of heterogeneous catalyst or precursor thereof is obtained. Preferably, the different heterogeneous catalysts are each produced in amounts of from 0.1 to 500 g, preferably from 1 to 100 g, in particular from 5 to 50 g. It is also possible to produce larger and smaller amounts according to the invention.

After the desired amount of the catalyst or catalyst precursor has been produced, the substreams are changed to achieve a new catalyst composition. Then mixing and drying are performed again until the desired amount of catalyst has been produced. For each further catalyst composition, the steps are repeated one after the other (sequentially).

To achieve an as accurate as possible batch composition of the different heterogeneous catalysts, it is also possible to clean the system in a conventional manner between the two catalyst production operations. In this case, after producing the heterogeneous catalysts the substreams are turned off and the entire apparatus is cleaned, for example by washing with deionized water, the pH of which can be basic, neutral or acidic by adding acids and alkalis. The substreams for the next catalyst composition are then turned on and the catalyst production is continued.

The design of the size of the process can be matched to the respective requirements. Preferably, a total stream in the range from 600 ml/h to 15 l/h, particularly preferably from 0.5 to 3 l/h, in particular from 1.4 to 2.6 l/h, is employed. This total stream of the individual solutions, emulsions and/or dispersions is preferably kept as constant as possible during metering into the mixing apparatus and for drying, in order to ensure constant process conditions.

Operation should be carried out in a range for the good operation of a spray dryer.

With preference, the time period between mixing the solutions, emulsions and/or dispersions and drying should be kept as small as possible. With preference the time period is less than 10 minutes, preferably less than 5 minutes, more preferably less than 1 minute, particularly preferably less than 10 seconds, in particular less than 3 seconds, especially less than 1 second. The time period can be met by means of the equipment design of the connection between mixing apparatus and dryer, and also via the flow velocity. Preference is given to short paths between mixing apparatus and dryer. The mixing can also take place at the dryer inlet.

With preference, the ratio in step b) set and changed by central computer is control of the output of pumps each of which convey the different solutions, emulsions and/or dispersions separately into the mixing apparatus. Via the computer, not only the individual pump output can be controlled, but also the conveying period can be predetermined. The total process for the sequential production of a heterogeneous catalyst library can be carried out under computer control. Via a suitable software program and suitable computer control of the pumps, before the process is carried out the desired catalyst compositions can be determined and input into the computer. After charging the storage vessels with the desired solutions, emulsions and/or dispersions, the computer can then automatically calculate and control the output rates and amounts of the individual pumps. At the end of the production of a catalyst of a desired composition, the production apparatus can be cleaned under computer control, whereupon production of the next catalyst composition follows.

The computer can be provided with suitable input and output media or apparatuses. Customarily the computer has a screen and a keyboard and also a printer.

Also, according to the invention, not only the mixing in the mixing apparatus but also the drying in the dryer can be computer controlled. For example, a temperature program for the spray drying can be provided.

The solids obtained after the spray drying, for example homogeneous or heterogeneous catalysts, in particular heterogeneous catalysts, can be collected, stored and further processed in a suitable manner. Customarily the individual heterogeneous catalysts are collected in separate vessels and stored for further use. The type of collection and storage depends here on the further use. For example, the heterogeneous catalysts obtained can be introduced into different tubes of a tubular reactor or into different boreholes of a body made of a solid material. A corresponding reactor design which is suitable, in particular, for carrying out heterogeneously catalyzed gas-phase reactions is described by way of example in DE-A 199 55 789.

The heterogeneous catalyst produced by the inventive process can also be arranged in an array of vessels, in which case the arrangement of the vessels in the array can likewise be performed under computer control. By this means it is possible to store in the computer and keep available the individual composition of a heterogeneous catalyst batch in one position of the array.

The mixtures can be calcined to give the heterogeneous catalysts in step e) separately for the individual catalyst mixtures or together in the described array. By this means it can be assured that constant calcination conditions are maintained for all catalyst mixtures.

The catalyst precursor compositions are thermally treated at temperatures in the range from 250 to 1500° C., for example from 300 to 1000° C. (materials temperature), for example in a gas atmosphere containing inert or reactive gases (that is to say usually a gas atmosphere partially having $O_2$ and/or $NH_3$ in certain calcination phases). In addition, the calcination atmosphere can also contain $CO_2$, steam, acrylonitrile, NOx.

Reactive gases can have either reducing or oxidizing action. The calcination time is generally from a few minutes to several hours, customarily from 0.5 to 3 hours.

In the inventive process, N different mixtures are produced in the mixing apparatus and dried in the dryer.

According to the invention, any suitable solutions, emulsions and/or dispersions of elements and/or element compounds of the chemical elements present in the heterogeneous catalyst can be used. Preferably, the sprayable solutions, emulsions and/or dispersions comprise elements of groups I B, II B, III B, IV B, V B, VI B, VII B and VIII, the lanthanides, actinides or groups I A, II A, III A, IV A, V A, VI A and VII A of the Periodic Table of the Elements or their compounds or mixtures thereof. Components which are sprayed in the process are preferably metal salt solutions or metal salt dispersions or corresponding oxides. Optionally, dispersions of inorganic support materials such as $Al_2O_3$, $ZrO_2$, $SiO_2$, $Y_2O_3$, $TiO_2$, activated carbon, MgO, SiC or $Si_3N_4$ can also be used, provided that they are of a particle size which permits spray drying.

According to one embodiment of the invention, the process does not serve for producing a multi-metal oxide composition M of the general stoichiometry I $$Mo_1V_aM^1_bM^2_cM^3_dM^4_eO_n \quad (I),$$

where $M^1$=at least one of the elements of the group consisting of Te and Sb;

$M^2$=at least one of the elements of the group consisting of Nb, Ti W, Ta, Bi, Zr and Re;

$M^3$=at least one of the elements of the group consisting of Pb, Ni, Co, Fe, Pd, Ag, Pt, Cu, Au, Ga, Zn, Sn, In, Ce, Ir, Sm, Sc, Y, Pr, Nd and Th;

$M^4$=at least one of the elements of the group consisting of Li, Na, K, Rb, Cs, Ca, Sr, Ba;

a=from 0.01 to 1, b=from ≥0 to 1, c=from >0 to 1, d=from ≥0 to 0.5, e=from ≥0 to 1 and n=a number which is determined by the valence and frequency of the elements in (I) different from oxygen.

The liquid mixtures generally comprise a liquid chemical component which is used as solvent, emulsifier of dispersion aid for the further components of the mixture. Solvents or dispersion aids used are organic solvents, emulsifying aids and/or water, preferably water. Examples of suitable organic solvents are alcohols and paraffins and also acids such as acetic acid or inorganic acids, esters, ethers, ketones. In addition, mixtures of solvents with suitable dispersants such as organic additives can be used. If dispersions/suspensions are sprayed, the particles which are present in the dispersion/suspension should preferably be <50 μm, particularly preferably <10 μm. It is also possible according to the invention to convert finely particulate powders into stable dispersions or suspensions. In order to have to evaporate as little as possible dispersant, volume fractions as high as possible of the solids with simultaneously low viscosity of the dispersions or suspensions to be sprayed should be used. Content by mass of preferably from 0.5 to 50% by weight, particularly preferably from 1 to 30% by weight, are obtained when suitable dispersants are used.

Suitable dispersants are described, for example, in DE-A 199 55 789. The specific dispersants specified there can be used for dispersing a multiplicity of different finely particulate solids in a flowable medium (dispersion medium). Preferably from 0.1 to 10% by weight, particularly preferably from 0.5 to 5% by weight, of the dispersion media are used, based on the solid.

Preferred starting materials for producing the inventive heterogeneous catalysts are, for example, ammonium compounds. The solutions, emulsions and/or dispersions have a dissolved content or solids content of preferably from 0.5 to 50% by weight, particularly preferably from 1 to 30% by weight, based on the total solution, emulsion and/or dispersion. Starting compounds for the selected chemical elements which come into consideration are in principle the elements themselves, preferably in finely divided form, furthermore all compounds which contain the selected chemical elements in a suitable manner, such as oxides, hydroxides, oxyhydroxides, inorganic salts, preferably nitrates, carbonates, acetates and oxalates, organometallic compounds, alkoxides etc. The respective starting compounds can be used in the form of solutions, emulsions and/or dispersions.

Metals can be added in the form of their nitrates, oxalates, carbonates, hydrogen carbonates, chlorides, chlorates, sulfates, oxysulfates, hydrogen sulfates, hydroxides, as oxides, as peroxides, as carboxylates, for example acetates, oxalates, citrates or tartrates, or else as alkoxides. Some examples of these are:

A. Ammonium Salts
Ammonium heptamolybdate
Ammonium metavanadate
Ammonium paratungstate
B. Nitrates
Iron nitrate (II or III)
Silver nitrate
Bismuth nitrate
C. Sulfate/Oxysulfate
Iron sulfate
Titanium oxysulfate
D. Oxalate:
Niobium oxalate
E. Tartrates
Antimony tartrate
Niobium tartrate In addition, it is possible to add separately solutions of ammonium acetate, acetic acid, ammonium oxalate, oxalic acid, ammonium tartrate, tartaric acid, ammonium citrate, citric acid or else ammonium EDTA, and also mixtures of these components can be added.

In addition, buffer systems can be charged, added and co-sprayed both to the individual salts and as a separate buffer solutions, for example the carbonate buffer system, the borate buffer system, the acetate buffer system or else the citrate buffer system.

Preferred element compounds, in particular of catalytically active metals, are water-soluble oxides, hydroxides, acids or salts of organic or inorganic acids, neutralized with inorganic or organic bases. Active metals are preferably found in the subgroups of the Periodic Table of the Elements for example in subgroup V and subgroup VI for oxidation catalysts and in the platinum group for hydrogenation catalysts. The inventive process also permits screening of (atypical) elements which have not to date been considered as catalytically active, in particular metals and metal oxides. Preferably there are contained in the individual solutions, emulsions and/or dispersions in each case one or more, more preferably 2 or more, particularly preferably 3 or more, chemical elements, but generally no more than 50 different chemical elements at an amount in each case of more than 1% by weight. Preferably, the chemical elements are present in the mixtures in a very intimate mixture, for example in the form of a mixture of various miscible solutions, intimate emulsions of a small droplet size and/or preferably as a suspension (dispersion) which contains the relevant chemical elements generally in the form of a finely divided precipitate, for example in the form of a chemical mixed precipitate. The use of brines and gels is also proven, in particular of those which contain the relevant chemical elements in a substantially homogeneous distribution.

The inventively produced heterogeneous catalysts can be suitable for any chemical reactions. Preferably homogeneous catalysts are for reacting gases or gas mixtures, in particular oxidation reactions. Examples of suitable reactions are the destruction of nitrogen oxides, ammonia synthesis, ammonia oxidation, oxidation of hydrogen sulfide to sulfur, oxidation of sulfur dioxide, direct synthesis of methylchlorosilanes, oil refining, oxidative coupling of methane, methanol synthesis, hydrogenation of carbon monoxide and carbon dioxide, conversion of methanol to hydrocarbons, catalytic reforming, catalytic cracking and hydrocracking, coal gasification and liquefaction, fuel cells, heterogeneous photocatalysis, synthesis of MTBE and TAME, isomerizations, alkylations, aromatizations, dehydrogenations, hydrogenations, hydroformylations, selective or partial oxidations (for preparing saturated or unsaturated carboxylic acids, for example propene to acrylic acid, propane to acrylic acid, butane to maleic anhydride), ammoxidations (for example propane to acrylonitrile), preparation of saturated or unsaturated carboxylic acids, anhydrides and aldehydes, ketenes, aminations, halogenations, nucleophilic aromatic substitutions, addition and elimination reactions, oligomerizations and metathesis, polymerizations, enantioselective catalysis and biocatalytic reactions.

The inventively used solutions, emulsions and/or dispersions can in addition be adjusted to a defined pH range by adding acids and/or bases. It is also possible to meter acids and/or bases from separate storage vessels into the mixing apparatus.

In many cases, pH-neutral suspensions are used.

The invention also relates to an apparatus for the sequential production of a library of N different heterogeneous catalysts, where N is an integer of at least 2, comprising a number of at least 2 storage vessels for receiving solutions, emulsions or dispersions of elements and/or element compounds of the chemical elements present in the catalyst and optionally of dispersions of inorganic support materials, a mixing apparatus for mixing the solutions, emulsions and/or dispersions, pumps and pipe connections for the individually independent connection of the storage vessels to the mixing apparatus, an apparatus for drying the mixture passed out of the mixing apparatus which is connected to the mixing apparatus via piping, and a computer which controls the output rate of the pumps.

The apparatus for drying is preferably a spray dryer or spray-freeze dryer. Customarily two or more storage vessels are used. Preferably, from 2 to 20 storage vessels, particularly preferably from 3 to 8 storage vessels, are used. The dimensioning of the storage vessels has already been described above. The inventively used apparatus in addition preferably has the abovedescribed features and properties.

The inventive process and the inventive apparatus permit in advantageous manner the production of larger amounts of catalyst than is possible by the known combinatorial processes. By means of the automated production, numerous catalyst compositions can be synthesized in a short time and with low expenditure. The catalysts can be obtained in a form in which they are also used in a later practical application. The inventive catalyst production is thus considerably closer to practice than the previously known processes.

The invention will be described in more detail by the examples below.

EXAMPLE 1

Production of a Multi-Metal Oxide Composition

To produce a subsolution A, first 4 000 ml of water were heated to 80° C. in a glass vessel. Therein, maintaining 80° C. and with stirring, 706.2 g of ammonium heptamolybdate from H. C. Starck, Goslar (DE) having an $MoO_3$ content of 81.53% by weight (=4 mol of Mo) were dissolved. Likewise at 80° C., 141.0 g of ammonium metavanadate from H. C. Starck, Goslar (DE) having a $V_2O_5$ content of 77.4% by weight (=1.2 mol of V) were stirred into the resultant clear solution and dissolved. Likewise at 80° C., 211.28 g of $Te(OH)_6$ from Fluka Chemie GmbH, Buchs (CH) having a $Te(OH)_6$ content of ≥99% (=0.92 mol of Te) were stirred into the resultant clear solution and dissolved. The resultant reddish solution was cooled to 25° C. and, with stirring, was supplemented with water of temperature 25° C. to give a clear transparent subsolution A of a total volume of 4 500 ml.

To produce a subsolution B, 221.28 g of niobium ammonium oxalate from H. C. Starck, Goslar (DE) having an Nb content of 20.1% by weight (0.48 mol of Nb) were dissolved in 1 000 ml of water which had been heated to a temperature of 80° C. The resultant clear transparent solution was cooled to 25° C. was supplemented with water which likewise had a temperature of 25° C. to give a clear transparent subsolution B having a total volume of 1 500 ml.

The two stable aqueous solutions A and B were continuously pumped by means of two laboratory metering pumps of the type ProMinent, and of type gamma g/4a, via two separate plastic tubes into the two inlet parts of a Y-shaped plastic T piece. The three tubular parts of the T piece (2 inlet parts and 1 outlet part) each had an internal diameter of 5 mm and a length of 38 mm. The solution A was transported as a stream of a volumetric flow rate of 1 500 ml/h and the solution B as a stream of a volumetric flow rate of 500 ml/h. In the interior of the T piece, the two solution streams A and B were combined to form a total solution stream of 2 000 ml/h which flowed into the outlet part of the T piece. In this was situated a type SMXS static mixer from Sulzer Chemtech, Ober-Mörlen-Ziegenberg (DE). The diameter of the static mixer was 4.8 mm, and the length of the mixer bar was 35 mm. The end of the outlet part of the T piece was connected directly to the atomizer head of a spray dryer (Niro Atomizer, Minor-Hi-Tec type, from Niro, Copenhagen, (DK)) which atomized the fed mixed solution stream (droplet size approximately 30 μm). Within the atomizer head which was mounted in the center of the hot-air distributor fixed to the ceiling of the drying tower, the mixed solution steam flowed through a 15 cm long connection line having an internal diameter of 6 mm directly to an atomizer disk (channel disk) rotating at 30 000 rpm. The resultant sprayed mist was dried by a hot air stream (cocurrent, inlet temperature 320° C., outlet temperature 105° C.). Within 3 h, the 6 000 ml in total of total solution stream could be spray dried.

From the total solution stream of 2 000 ml/h, the internal diameter of the outlet part of the T piece and the length of the static mixing section of 35 mm, a time period $t^1$ of approximately 1.2 seconds may be calculated, within which the combined subsolution streams A and B are converted into an essentially homogeneous mixed solution stream. Additionally taking into account the transport of the mixed solution stream from the outlet of the static mixer through the 15 cm long connection line in the atomizer head having an internal diameter of 6 mm to the point of atomization, this gives a time period $t^2$ from combining the solution streams A and B to atomizing their mixed solution stream of less than nine seconds. Incorporating a drying time of less than one second, the time period $t^3$ from combination up to the dry powder is less than ten seconds. In accordance with the weighed stoichiometry of solution A and solution B and of the subsolution streams chosen (3:1), the resultant spray powder contains the elements Mo, V, Nb and Te in the molar stoichiometric ratio of $Mo_1V_{0.3}Nb_{0.12}Te_{0.23}$ (if the outlet part of the T piece was not connected directly to the atomizer head of the spray dryer, but instead a 15 cm long transparent plastic tube having an internal diameter of 6 mm was connected to the end of the outlet part of the T piece, through which the mixed solution stream was transported into a collection vessel situated beneath, a visual inspection found that the mixed solution stream contains no precipitate not only on the entire length of the plastic tubing but also on its arrival in the collection vessel and was clear and transparent on the complete extent; a filtration experiment on the mixed solution flowing out from the plastic tubing confirmed the freedom from solids).

150 g of the resultant spray powder were heated in a rotary sphere oven according to FIG. 1 of DE-A 101 18 814 under air (10 l (S.T.P.)/h) at a heating rate of 5° C./min from room temperature (25° C.) to 275° C. Immediately thereafter heating was performed under a molecular nitrogen stream (10 l (S.T.P.)/h) at a heating rate of 2° C./min from 275° C. to 650° C. and this temperature was kept for 6 h, maintaining the nitrogen stream. Then, maintaining the nitrogen stream, cooling was performed by this itself, to 25° C. A black calcined multi-metal oxide active composition M was obtained.

By varying the substreams, different compositions of the multi-metal oxide composition could be obtained.

EXAMPLE 2

Nine catalysts were produced for the single-stage propane oxidation in a preparation system consisting in detail of 5 reservoir vessels, peristaltic pumps, mixer and spraying tower and in a central control unit.

In heatable glass vessels (=reservoir vessels) each having a volume of 5 l and which were equipped with KPG agitators, solutions of the following components were made up:
 (i) 130 g/l of ammonium heptamolybdate (H. C. Starck, Goslar, 82.55% by weight of $MoO_3$) in deionized water (solution A),
 (ii) 28 g/l of ammonium metavanadate (G.f.E., Nuremberg, 77.5% by weight of $V_2O_5$) in deionized water (solution B),
 (iii) 37 g/l of telluric acid (Fluka, 99% $H_6TeO_6$) in deionized water (solution C) and
 (iv) 200 g/l of ammonium niobium oxalate (H. C. Starck, Goslar, 22.0% by weight of Nb) in deionized water (solution D).

Each vessel is connected via a line (internal diameter 6 mm) to a mixing star to which the individual solutions were led together. From there the mixture of the dissolved metal salts passes through a mixer (ultrasonic emitter from Dr Hielscher, type UIP 50) and is then passed to a spraying tower. The individual solutions were conveyed by 5 peristaltic pumps (1 pump per reservoir vessel) to the mixing star and further into the mixing vessel of the uyltrasonic emitter. The mixed solution was fed via an overflow apparatus to the spraying tower which draws in the solutions, in addition to the transport due to the pumps. The spraying tower used (BASF in-house construction, diameter of the spraying tower 35 cm) is equipped with a two-fluid nozzle and is charged with nitrogen not only for atomizing the aqueous mixture but also for drying the sprayed mixture particles (gas inlet temperature: 290° C.; gas outlet temperature 130° C.). The dried product is separated off in a cyclone and collected. The transport rates of the solutions A to D through the peristaltic pumps and the operation of the spraying tower are controlled by a central PC into which only the concentrations of the starting solutions and the desired stoichiometry need to be input. When the spray drying for a selected composition is complete, the collection vessel beneath the cyclone must be exchanged, which can be performed manually or automatically.

The product obtained was tableted (diameter 16 mm, height=10 mm) and preliminarily fragmented in a mortar (grain size fraction 0.7-1.0 mm). 3 ml of these fragments are placed in a calcination oven in which 14 catalysts can be calcined in parallel in separate vessels (shared gas supply to all calcination tubes). This calcination unit is inserted into a muffle furnace from Nabotherm and charged with gas. The temperature of the muffle furnace was first increased linearly from room temperature at a gradient of 1.5° C./min to 275° C. under an air current of 400 l(S.T.P.)/h and held there for 2 h. The gas supply was then switched from air to nitrogen (400 l(S.T.P.)/h) and the system was likewise heated to 600° C. linearly at a gradient of 1.5° C./min. At this temperature the catalysts were held for 3 h before the furnace, left alone, cooled to room temperature. The resultant catalyst was then again comminuted and the particle fraction of 0.4-0.7 mm was separated off for the catalytic tests.

In this way the following catalysts were produced within one day. The time required per sample without tableting and calcination was approximately 45 min.

1. $Mo_1V_{0.4}Te_{0.2}Nb_{0.06}O_x$.
2. $Mo_1V_{0.4}Te_{0.2}Nb_{0.20}O_x$.
3. $MO_1V_{0.4}Te_{0.1}Nb_{0.12}O_x$.
4. $Mo_1V_{0.4}Te_{0.3}Nb_{0.12}O_x$.
5. $Mo_1V_{0.2}Te_{0.2}Nb_{0.12}O_x$.
6. $Mo_1V_{0.5}Te_{0.2}Nb_{0.12}O_x$.
7. $Mo_1V_{0.4}Te_{0.2}Nb_{0.12}O_x$.
8. $Mo_1V_{0.4}Te_{0.2}Nb_{0.12}O_x$.
9. $Mo_{1.3}V_{0.4}Te_{0.2}Nb_{0.12}O_x$.
10. $Mo_1V_{0.4}Te_{0.2}Nb_{0.12}O_x$.

COMPARATIVE EXAMPLE 2

Production of a catalyst of composition $Mo_1V_{0.4}Te_{0.2}Nb_{0.12}O_x$:

52.57 g of ammonium metavanadate (G.F.E., Nuremberg, 77.5% by weight of $V_2O_5$, ideal composition: $NH_4VO_3$) and then the temperature was reduced to 60° C. To this solution were then added 52.47 g of telluric acid (Fluka, 99% $H_6TeO_6$) and 200.0 g of ammonium heptamolybdate hydrate (H. C. Starck, Goslar, 82.55% by weight of $MoO_3$, ideal composition: $(NH_4)_6Mo_7O_{24}.4H_2O$), the components were dissolved and finally the temperature of the solution was reduced to 30° C. (solution A). In parallel, at 60° C., a solution of 62.23 g of ammonium niobium oxalate (H. C. Starck, Goslar, 20.3% by weight of Nb) was prepared in 250 g of water and its temperature after the dissolution operation was reduced to 30° C. (solution B). At 30° C., solution B was added to solution A (approximately 4 min), whereupon, after a short time, an orange-red suspension without precipitate formed. This suspension was dried in a spray dryer (apparatus from Niro, $T_{in}$=290° C., $T_{out}$=130° C.).

The resultant product was tableted in the same manner (diameter 16 mm height=10 mm) and fragmented as described above. 70 g of the resulting fragments were heated in a rotary sphere oven (quartz glass sphere of 1 liter internal capacity) under air (50 l (S.T.P.)/h) at a heating rate of 1.5° C./min to 275° C. and were kept at this temperature for 1 h. The dry composition was then heated to 600° C. under nitrogen (50 l(S.T.P.)/h) at a heating rate of 1.5° C./min and kept at this temperature for 2 h. The cooling to room temperature was likewise performed under nitrogen.

The time required for producing the sample without tableting and calcination was approximately 5 h.

The invention claimed is:

1. A process for the sequential production of a library of N different solids, comprising heterogeneous catalysts, wherein N, within a day of beginning production, is an integer of at least 2, the process comprising
    a) producing at least two different sprayable solutions, emulsions and/or dispersions of elements and/or element compounds of the chemical elements present in the catalysts,
    b) continuously metering the at least two different solutions, emulsions and/or dispersions in a predefined ratio into a mixing apparatus in which the solutions, emulsions and/or dispersions are homogeneously mixed to form a mixture,
    c) continuously drying the mixture removed from the mixing apparatus, wherein the drying is performed by spray drying or spray-freeze drying, to produce a dried mixture, and recovering the dried mixture that is a solid, and
    d) changing the ratios in b) and repeating b), c) and d) (N−1) times until N different solids are obtained;
    wherein the ratio in b) and d) is set and changed by changing or adapting the flow velocities of the different solutions, emulsions and/or dispersions during the metering into the mixing apparatus and the total stream of the individual solutions, emulsions and/or dispersions remains constant during the metering in the mixing apparatus and to the drying.

2. The process as claimed in claim 1, wherein a time period between mixing the solutions, emulsions and/or dispersions and drying is a positive time period of less than 10 minutes.

3. The process as claimed in claim 1, wherein the different solids are produced in each case in amounts of from 0.1 to 500 g.

4. The process as claimed in claim 1, wherein the ratio in b) is set and changed by central computer control of output of pumps which in each case separately transport the different solutions, emulsions and/or dispersions into the mixing apparatus.

5. The process as claimed in claim 1, wherein the solids obtained in d) are tested for a desired catalytic property by a process comprising,
    separately introducing the individual solids into multiple reactors, and subsequently testing each solid for the desired catalytic property.

6. The process of claim 1, wherein N is at least 9.

7. The process of claim 1, wherein N is at least 45.

8. The process of claim 1, wherein N is at least 90.

9. The process of claim 1, wherein N ranges from at least 2 to 5,000.

10. The process of claim 1, wherein N ranges from at least 2 to 50,000.

11. The process of claim 1, wherein the different solids are produced in each case in amounts of from 1 to 100 g.

12. The process of claim 1, wherein the at least two different sprayable solutions, emulsions, and/or dispersions each have a dissolved solids content and/or a solids content of 0.5 to 50% by weight, based on the total weight of the solution, emulsion and/or dispersion.

13. The process of claim 1, wherein the at least two different sprayable solutions, emulsions, and/or dispersions each have a dissolved solids content and/or a solids content of 1 to 30% by weight, based on the total weight of the solution, emulsion and/or dispersion.

14. The process of claim 1, wherein each sprayable solution, emulsion and/or dispersion comprises a unique element compound.

15. The process of claim 14, wherein each unique element compound is differently selected from one of ammonium heptamolybdate, ammonium metavanadate, ammonium paratungstate, iron (II) nitrate, iron (III) nitrate, silver nitrate, bismuth nitrate, iron sulfate, titanium oxysulfate, niobium oxalate, antimony titrate, or niobium tartrate.

16. The process of claim 14, wherein each unique element compound comprises a unique catalytically active metal.

17. The process of claim 16, wherein each unique catalytically active metal is, individually, selected from subgroup V and/or subgroup VI of the Periodic Table of the Elements.

18. The process of claim 16, wherein each unique catalytically active metal is selected from the platinum group of the Periodic Table of the Elements.

19. The process of claim 1, wherein each sprayable solution, emulsion and/or dispersion comprises a unique element.

20. The process of claim 19, wherein each unique element is a metal and/or transition metal.

* * * * *